United States Patent [19]

Eguchi

[11] Patent Number: 4,612,119

[45] Date of Patent: Sep. 16, 1986

[54] HOLLOW FIBER FILTER MEDIUM AND PROCESS FOR PREPARING THE SAME

[75] Inventor: Tamiyuki Eguchi, Kobe, Japan

[73] Assignee: Kanegafuchi Kagaku Kogyo Kabushiki Kaisha, Osaka, Japan

[21] Appl. No.: 597,890

[22] Filed: Apr. 9, 1984

[30] Foreign Application Priority Data

Apr. 9, 1983 [JP] Japan .................................. 58-62835

[51] Int. Cl.$^4$ .............................................. B01D 13/00
[52] U.S. Cl. ............................ 210/500.23; 264/178 F; 210/500.41
[58] Field of Search ............... 210/321.1, 321.3, 500.2, 210/654; 264/41, 178 F

[56] References Cited

U.S. PATENT DOCUMENTS 4,286,015 8/1981 Yoshida et al. ................... 264/41 X
4,385,094 5/1983 Tanaka et al. ..................... 264/41 X

FOREIGN PATENT DOCUMENTS 106137 8/1978 Japan ................................ 210/500.2

OTHER PUBLICATIONS

Cabasso et al., "Polysulfone—Properties", from Journal of Applied Polymer Science, vol. 20, pp. 2377–2394, 1976.

Primary Examiner—Frank Spear
Attorney, Agent, or Firm—Armstrong, Nikaido, Marmelstein & Kubovcik

[57] ABSTRACT

A polysulfone hollow fiber filter medium having substantially no skin layer in the outer and inner surface areas, the maximum diameter of the pores being from 0.1 to 5 μm., the maximum diameter of the openings of the pores formed in the inner surface being from 0.01 to 10 μm. and the maximum diameter of the openings of the pores formed in the outer surface being from 0.01 to 5 μm., which is prepared by extruding a solvent solution of a polysulfone from a ring nozzle together with an inside coagulating liquid extruded from the inside of the ring nozzle, said solution having a transition temperature at which the viscosity rise changes to the viscosity drop when the temperature of the solution is dropped, and being maintained at a temperature of not less than the transition temperature, and immediately or after passing through a dry space of not more than 50 cm., bringing the extrudate into contact with an outside coagulating liquid, at least one of the inside coagulating liquid, the dry space and the outside coagulating liquid being maintained at a temperature of less than the transition temperature.

5 Claims, 12 Drawing Figures

4,612,119

HOLLOW FIBER FILTER MEDIUM AND PROCESS FOR PREPARING THE SAME

BACKGROUND OF THE INVENTION

The present invention relates to a filter medium in th form of a hollow fiber. More particularly, to a hollow fiber filter medium having a large pore diameter made of a polysulfone resin and a process for the preparation thereof.

Hollow fiber filter mediums have the following advantages. They enable a filter to be made in a small size with a simple structure. The flow of a fluid through the filter becomes uniform, since the effective membrane area per unit volume can be made large as compared with flat filter mediums. Therefore, in recent years, porous hollow fibers are being utilized as filter mediums in various fields in place of the flat filter membrane.

Among the known hollow fiber filter mediums are hollow fibers made from resins such as polyvinyl alcohol, cellulose acetate, polymethyl methacrylate, polypropylene and polyethylene. These are known as hollow fiber filter mediums having a large pore diameter. The hollow fiber filter mediums made from these resins are not always satisfactory both in performance and preparation method thereof. For instance, performance is undesirable that steam sterilization requiring high temperatures is impossible because of a lack in heat resistance. Also the rate of filtration is low and the chemical resistance, mechanical strength or affinity for a living body is insufficient. Also, the methods for the preparation thereof have the defects that because of using high molecular weight compounds as pore-forming agents, a long time is required for removing them by extraction. It is also necessary, therefor, to use toxic solvents.

A polysulfone resin is superior in heat resistance, mechanical resistance, chemical resistance and affinity for a living body. It has been utilized as a support for ultrafiltration membrane and reverse osmosis membrane, and many literatures describing such uses have been published. However, a polysulfone hollow fiber filter medium having a large pore diameter, at least having pores or openings of 0.01 to several micronmeters in diameter in the inner and outer surfaces, cannot be prepared by a conventional technique. Therefore, no polysulfone hollow fiber filter medium having pores or openings of not less than 0.01 $\mu$m. in diameter at least in the inner and outer surfaces has been provided up to now. For instance, processes for preparing polysulfone hollow fibers are reported in Japanese Unexamined Patent Publication (Tokkyo Kokai) No. 16378/1979, No. 143777/1979, No. 145379/1979, No. 152704/1981 and No. 83515/1982; and Journal of Applied Polymer Science, Vol. 20, 2377–2394(1976), Vol. 21, 165–180(1977) and Vol. 21, 1883–1900(1977). These publications disclose processes for preparing hollow fibers having a so-called asymmetric structure. That is, hollow fibers substantially having a thin, dense layer containing pores of less than 0.01 $\mu$m. in diameter in either one or both of the inner surface and the outer surface thereof. The amount of water permeation of these hollow fibers is small, even if the dense layer is made as thin as possible.

It is an object of the present invention to provide a porous hollow fiber having a large pore diameter which is useful as a filter medium.

A further object of the invention is to provide a hollow fiber filter medium having a large pore diameter and which is excellent in heat resistance, mechanical strength, chemical resistance and affinity for a living body.

Another object of the invention is to provide a process for preparing a porous hollow fiber useful as a filter medium.

These and other objects of the present invention will become apparent from the description hereinafter.

SUMMARY OF THE INVENTION

In accordance with the present invention, there is provided a filter medium in the form of a porous hollow fiber made of a polysulfone having a network structure over the entire thickness from the inner surface to the outer surface. The pores of the hollow fiber have a maximum diameter of 0.1 to 5 $\mu$m., the openings of the pores formed in the inner surface have a maximum diameter of 0.01 to 10 $\mu$m. and the openings of the pores formed in the outer surface have a miximum diameter of 0.01 to 5 $\mu$m.

The polysulfone hollow fiber filter medium of the present invention has excellent heat resistance, mechanical strength, chemical resistance and affinity for a living body. Also, since the pores formed by the network structure have a maximum diameter of 0.1 to 5 $\mu$m., the openings formed in the inner surface of the hollow fiber have a maximum diameter of 0.01 to 10 $\mu$m. and the openings formed in the outer surface of the hollow fiber have a maximum diameter of 0.01 to 5 $\mu$m., the hollow fiber filter medium of the invention has an excellent water permeability and filtration ability.

BRIEF DESCRIPTION OF THE DRAWINGS

FIGS. 1 to 10 are microphotographs of the hollow fibers of the present invention, in which FIG. 1 is a photograph of a section of the hollow fiber of the invention observed by a microscope of 100 magnifications;

FIG. 2 is a photograph of the inner surface of the hollow fiber shown in FIG. 1, observed by a microscope of 11,100 magnifications;

FIG. 3 is a photograph of the outer surface of the hollow fiber shown in FIG. 1, observed by a microscope of 30,000 magnifications;

FIG. 4 is a photograph of the section of another hollow fiber of the invention observed by a microscope of 100 magnifications;

FIG. 5 is a photograph of the outer surface area, in the sectional portion enclosed with the rectangle shown in FIG. 4, observed by a microscope of 1,000 magnifications;

FIG. 6 is a photograph of the inner surface of the hollow fiber shown in FIG. 4, observed by a microscope of 5,000 magnifications;

FIG. 7 is a photograph of the outer surface of the hollow fiber shown in FIG. 4, observed by a microscope of 10,000 magnifications;

FIG. 8 is a photograph of the inner surface area in the section of the hollow fiber shown in FIG. 4, observed by a microscope of 10,000 magnifications;

FIG. 9 is a photograph of the middle portion between the inner and outer surface areas in the section of the hollow fiber shown in FIG. 4, observed by a microscope of 10,000 magnifications; and FIG. 10 is a photograph showing the outer surface and the outer surface area in the section of the hollow fiber shown in FIG. 4, observed by a microscope of 10,000 magnifications;

DETAILED DESCRIPTION

The follow fiber filter medium of the present invention is prepared from a polysulfone. Any of the known polysulfone resins can be employed in the present invention. Aromatic polysulfone resins are preferable. Representative examples of the polysuflone resins used in the invention are a polysulfone having recurring units of the general formula (I):

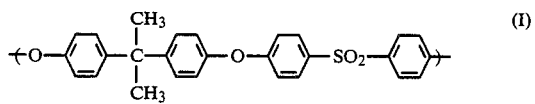

and a polysulfone having recurring units of the general formula (II):

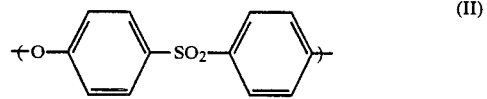

The polysulfone (I), which has hitherto been used as a material for ultrafiltration membranes, is excellent in fundamental characteristics such as heat resistance, mechanical strength, chemical resistance and affinity for a living body. Accordingly it is preferably used as material for preparing the filter medium of the present invention.

The filter medium of the present invention is in the form of a hollow fiber having a network structure or a sponge structure over the entire thickness from the inner surface to the outer surface. The maximum diameter of the pores of the porous hollow fiber is from 0.1 to 5 $\mu$m., the maximum diameter of the pore openings formed in the inner surface of the hollow fiber is from 0.01 to 10 $\mu$m., and the maximum diameter of the pore openings formed in the outer surface is from 0.01 to 5 $\mu$m. The filter medium of the invention has a water permeability of not less than $2.0 \times 10^{-3}$ g./cm.$^2$mmHg.min.

The term "maximum diameter" as used herein means the length of the largest minor axis of the pores or openings of the hollow fiber as observed by a microscope.

Figure 1:
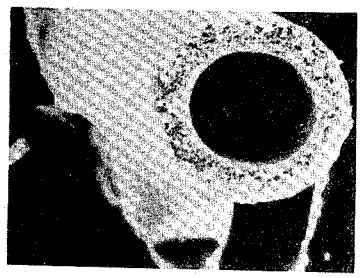
Figure 2:
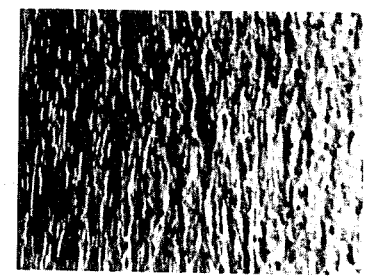
Figure 3:
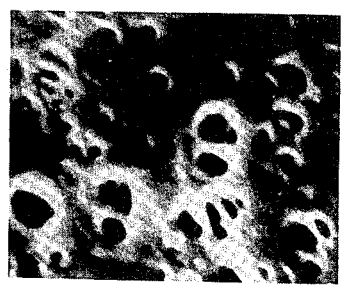
Figure 4:
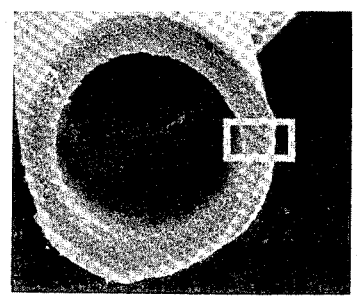
Figure 5:
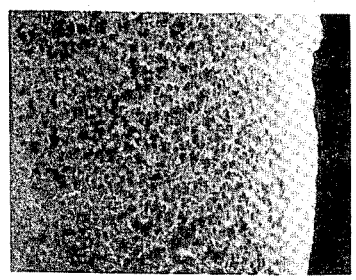
Figure 6:
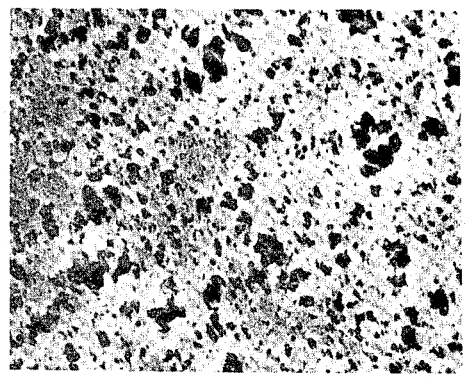
Figure 7:
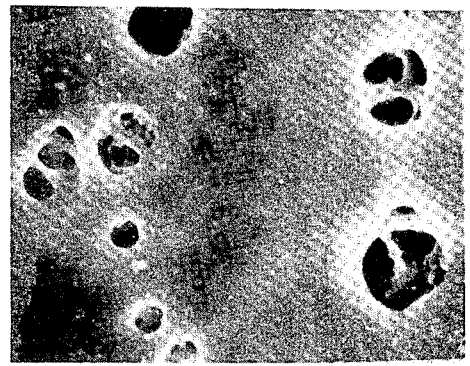
Figure 8:
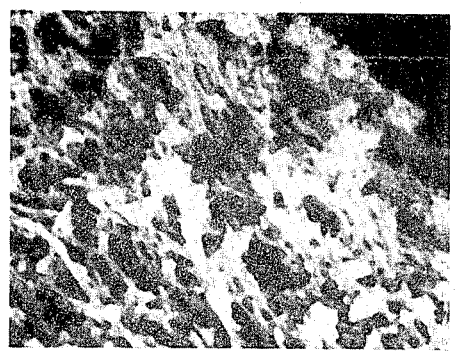
Figure 9:
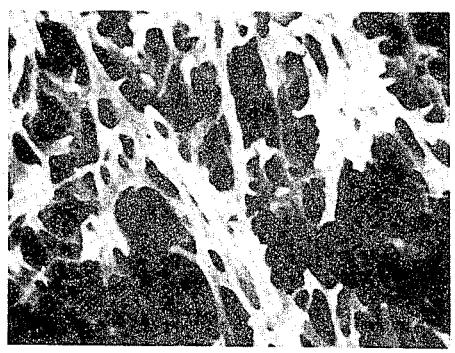
Figure 10:
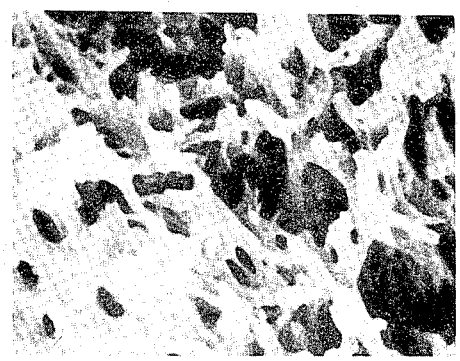

The structure of the filter medium of the present invention will be explained with reference to the drawings. FIG. 1 which is a micrograph of a section of the hollow fiber of the invention, shows that the hollow fiber has a uniform network or sponge structure. The maximum diameter of the pores is about 5 $\mu$m. FIGS. 2 and 3 show that openings of the pores are present on the inner wall surface and the outer wall surface of the hollow fiber and that these maximum diameters of the openings are about 0.04 $\mu$m. and about 0.3 $\mu$m., respectively. FIGS. 4 and 5 which are micrographs of a section of another hollow fiber of the invention, show that the hollow fiber has a uniform network or sponge structure and that the maximum diameter of the pores is about 1.5 $\mu$m. FIGS. 6 and 7 show that openings of the pores are present on the inner wall surface and the outer wall surface of the hollow fiber and the maximum diameters of the openings are about 1 $\mu$m. and about 1.5 $\mu$m., respectively. FIG. 8 in which the portion near the inner wall surface in the section of the hollow fiber in FIG. 4 is enlarged, and FIG. 6, show that the network or sponge structure forms openings of indeterminate shape on the inner wall surface with a wide distribution of opening diameters. Also, FIG. 10 in which the outer wall surface and the portion near the outer wall surface in the section of the hollow fiber shown in FIG. 4 are enlarged, shows the network or sponge structured forms elliptic or circular openings on the outer wall surface.

As is clear from the drawings and the explanation therefor, the filter medium of the present invention has the following features.

(1) The portion between the inner surface and the outer surface of the hollow fiber has a network or sponge structure.

(2) A dense layer having only pores which are smaller than the pores present in the sponge, namely a skin layer, is not present in the inner and outer surface areas of the hollow fiber.

(3) The openings in the inner and outer surfaces of the hollow fiber are formed by a part of the sponge broken outwardly.

(4) The openings formed in the inner surface are in an indeterminate form and have a wide size distribution within the range of not more than the maximum diameter, and the rate of the area of openings in the inner surface is large.

(5) The water permeability is large, and it is possible to obtain the filter medium having a water permeability of $2.0 \times 10^{-3}$ to $40 \times 10^{-3}$ g./cm.$^2$mmHg.minute.

(6) The openings formed in the outer surface are elliptic or circular.

The above features indicates that the hollow fiber filter medium of the present invention greatly differs from conventional polysulfone hollow fibers.

The inner diameter and wall thickness of the hollow fiber filter medium of the invention are not technically limited to particular ranges. Usually, the inner diameter is selected from 100 $\mu$m. to 3 mm. and the wall thickness is selected from 20 to 500 $\mu$m., according to the intended purpose.

When either one of the maximum diameters of the openings on the inner surface and the openings on the outer surface is less than 0.01 $\mu$m., the amount of water permeated is smaller than that of a conventional ultrafiltration membrane, and accordingly one of the advantages of the invention, namely a good water permeability, is lost. Of course, another feature of the invention, that relatively large particles can permeate through the filter medium, is also lost. On the other hand, when the maximum diameters of all of the pores in the sponge body and the openings in the inner and outer surfaces exceed 5 $\mu$m., 10 $\mu$m. and 5 $\mu$m., respectively, the mechanical strength of the hollow fiber is lowered. Accordingly, it is preferable in practical use that the maximum diameters of the openings in the inner surface, the pores and the openings in the outer surface are from 0.01 to 10 μm., from 0.1 to 5 μm. and from 0.01 to 5 μm., respectively. It is preferable that the diameter of the pores is uniform over the entire thickness of the hollow fiber. A certain distribution in pore diameter is permissible as long as the difference is not large.

A usual wet process for preparing a hollow fiber is applicable to the preparation of the hollow fiber filter medium of the present invention. For instance, the hollow fiber is prepared by extruding a spinning solution, namely a solution of a polysulfone in an organic solvent, from the slit of a ring nozzle together with an inside coagulating liquid which is introduced from the inside portion of the nozzle, and immediately or after, passing through a dry space of not more than 50 cm., preferably not more than 20 cm., from the nozzle, bringing the whole into contact with an outside coagulating liquid. In the present invention, it is essential that the spinning solution of a polysulfone is prepared to have a transition temperature (Tc) at which the rise in viscosity changes to a drop in viscosity when the temperature of the spinning solution is lowered. Further, the spinning solution must be formulated to have the transition temperature Tc and be maintained at a temperature of not less than the Tc when extruded from the ring nozzle to the outside coagulating liquid, which at least one of the inside coagulating liquid, the gas contacting the extrudate in the dry space (of not more than 50 cm.), preferably not more than 20 cm. and the outside coagulating liquid is maintained at a temperature of less than Tc. This enables production a polysulfone hollow fiber having a network or sponge structure over the entire thickness extending from the inner surface to the outer surface of the hollow fiber.

The spinning solution is prepared by dissolving a polysulfone in a specific solvent. In order to obtain a spinning solution having a desired transition temperature Tc, it is desirable to use a solvent having a relatively high boiling temperature. Preferable solvents used for preparing the spinning solution are, for instance, dimethyl sulfoxide and mixed solvents of a major amount of one or more kinds of good solvents for polysulfone resins such as N-methyl-2-pyrrolidone, dimethylformamide and dimethylacetoamide and a minor amount of one or more kinds of non-solvents for polysulfone resins, which are used for adjusting the transition temperature Tc, e.g. polyhydric alcohols such as glycerol, propylene glycol, ethylene glycol and butanediol having a high boiling temperature such as cyclohexanol. The use of the mixed solvents is preferred, since a spinning solution having a desired transition temperature is obtained. The concentration of the polysulfone in the spinning solution is from 8 to 25% by weight, preferably 10 to 17% by weight. When the concentration is less than 8% by weight, the viscosity of the spinning solution is low and the spinning operation is difficult. When the concentration is more than 25% by weight, it is difficult to prepare a hollow fiber having large pores and openings.

The transition temperature of the spinning solution should be from 30° to 150° C., preferably 50° to 150° C. When the transition temperature is less than 30° C., it is necessary to use a cooler to maintain at least one of the inside coagulating liquid, the outside coagulating liquid and the gas present in the dry space, below the transition temperature. When the transition temperature is more than 150° C., the viscosity of the spinning solution becomes low because the spinning solution must be maintained at a high temperature. Accordingly the spinning is difficult.

Figure 11:
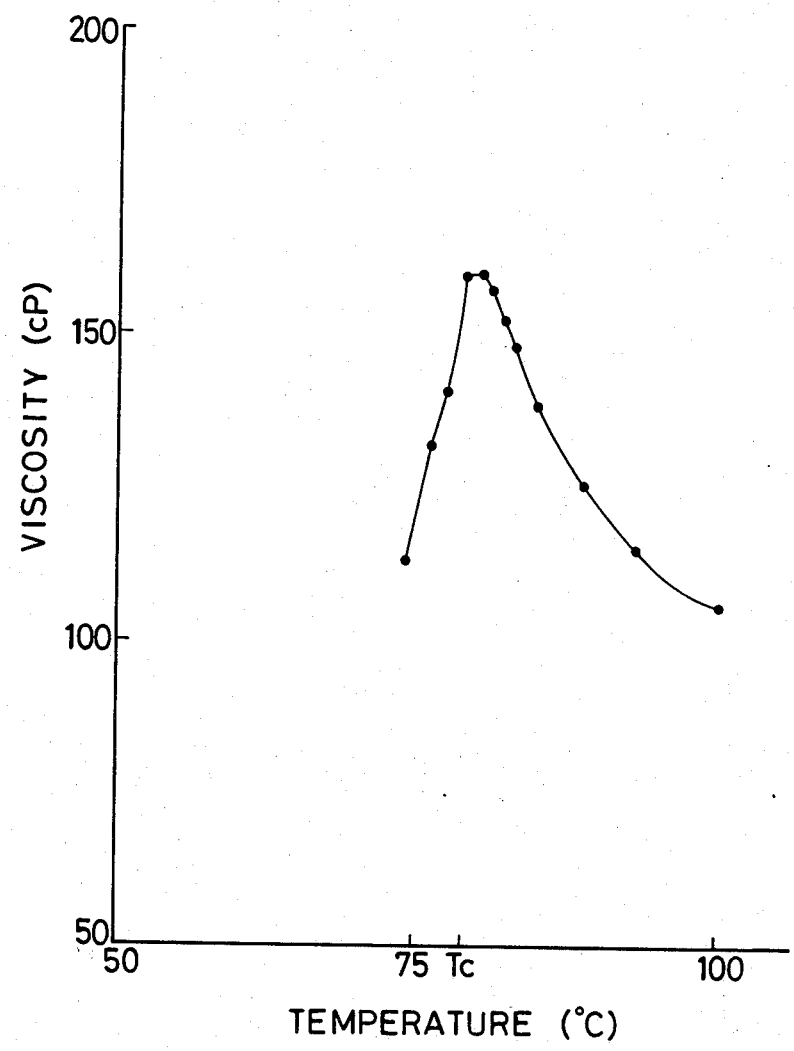
FIG. 11 is a graph showing the relationship betweens the temperature and the viscosity of a spinning solution (13% by weight solution of a polysulfone in a mixture of N-methyl-2-pyrrolidone and propylene glycol) as used in the preparation of the hollow fiber of the invention.
Figure 12:
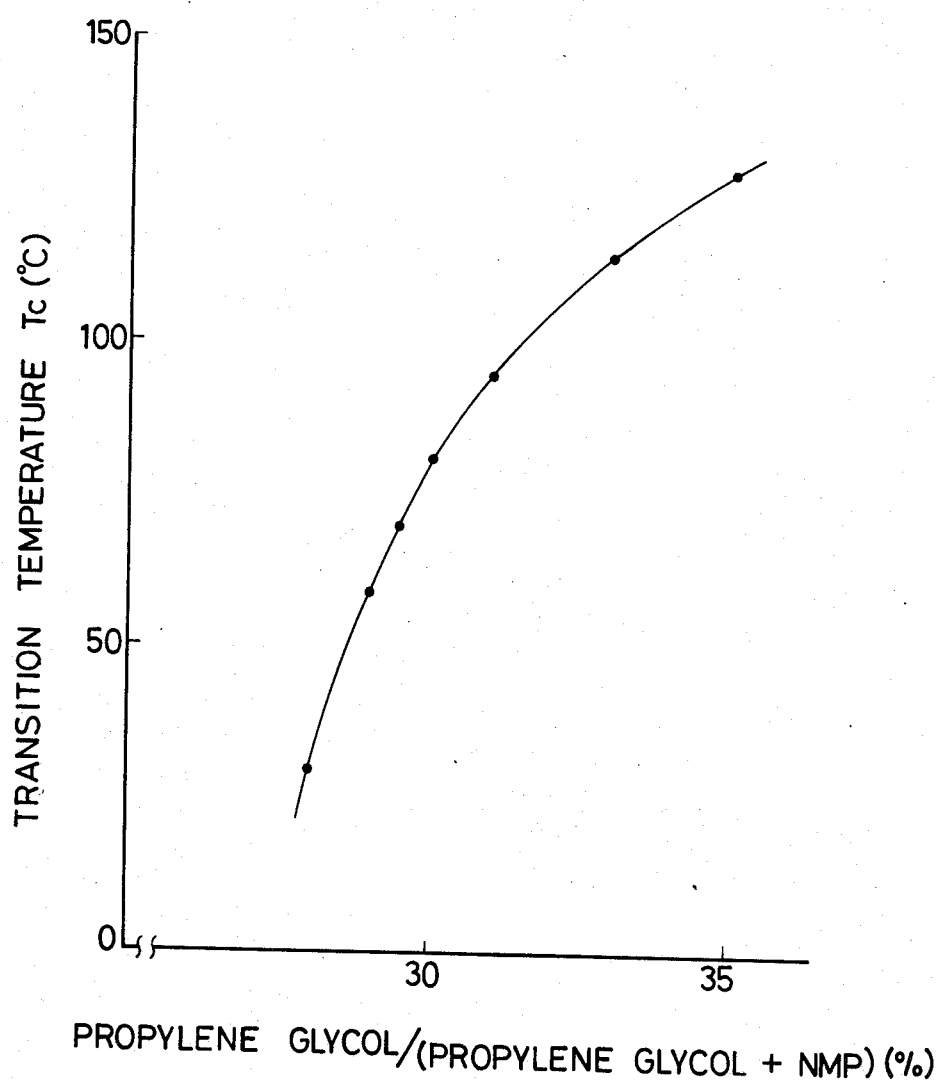
FIG. 12 is a graph showing the relationship between the proportion of the propylene glycol non-solvent in a mixed solvent used for the preparation of a spinning solution and a transition temperature at which the viscosity of the spinning solution reaches its maximum.

In many cases, the transition temperature Tc has a close relation to the cloud point of the spinning solution. This is related to the phase separation due to the temperature drop of the spinning solution. FIG. 11 is a graph showing the relationship between the temperature and the viscosity of a solution, as used in the process of the present invention as a spinning solution. The solution consists of 13.0% by weight of a polysulfone (commercially available under the commercial name "Udel Polysulfone P-3500" made by Union Carbide Corp.), 26.1% by weight of propylene glycol and 60.9% by weight of N-methyl-2-pyrrolidone (hereinafter referred to as "NMP"). FIG. 12 is a graph showing the change in the transition temperature Tc with the change in the proportion of propylene glycol (PG) in a PG-NMP mixed solvent of a 13.0% by weight polysulfone solution as shown in FIG. 11. As shown in FIG. 12, the transition temperature Tc can be controlled by changing the composition of a mixed solvent. The solvents used in the present invention serve as good solvents at temperatures of not less than Tc. Solutions of polysulfone having a composition such that the viscosity thereof suddenly drops with a temperature drop in the temperature range of less than the Tc are suited for use in the process of the invention as spinning solutions.

Non-solvents for the polysulfone having a miscibility with the solvents for the polysulfone and having an action of coagulating the polysulfone when contacted with the spinning solution are used as inside coagulating liquids and outside coagulating liquids in the present invention. Examples of the coagulating liquids used in the invention are, for instance, water, mixtures of the above-mentioned good solvents for the polysulfone and water, and alcohols such as methanol, ethanol and isopropanol.

In the present invention, a hollow fiber is formed by extruding the spinning solution which is maintained at a temperature of not less than the transition temperature Tc, together with the inside coagulating liquid, from a ring nozzle to a coagulation bath. The inner diameter and wall thickness of the hollow fiber will vary depending on the size of the nozzle, the draft ratio and the inflation ratio. However, the draft ratio should be within the range of about 0.8 to about 3 and the inflation ratio should be within the range of about 0.4 to about 1.3. Accordingly they do not exert a large influence upon the structures of the inner surface, the network and the outer surface. The structures of the inner surface, the network and the outer surface can be properly adjusted by changing other spinning conditions such as the temperature of the inside coagulating liquid. The draft ratio and the inflation ratio are defined as follows:

$$\text{Draft ratio} = \frac{V(d_1^2 - d_2^2)\pi}{4q_1}$$

$$\text{Inflation ratio} = \frac{4q_2}{Vd_2^2\pi}$$

wherein $d_1$ is an outer diameter of the ring nozzle, $d_2$ is an inner diameter of the ring nozzle, $q_1$ is an amount of spinning solution sent forth, $q_2$ is an amount of inside coagulating liquid sent forth, and V is a rate of spinning. In a conventional process for preparing a polysulfone hollow fiber, the hollow fiber is broken or burst during the spinning unless both the draft ratio and the inflation ratio are adjusted to about 1. In this respect, the process of the invention has a wide allowable range. A ring nozzle is usually employed as a nozzle from which the spinning solution is introduced. The spinning rate is determined according to the above-mentioned equations so as to satisfy the draft ratio and the inflation ratio while consideration is given to the relation of other factors. When the spinning rate is several tens of meters per minute, the operation is easy.

The spinning solution is introduced from the ring nozzle together with the inside coagulating liquid which is introduced into the inside of the tubular extrudate, and immediately or after passing through a dry space of not more than about 50 cm., preferably not more than about 20 cm., they are brought into contact with the outside coagulating liquid. At that time, at least one of the inside coagulating liquid, the gas in the dry space and the outside coagulating liquid is maintained at a temperature of less than the transition temperature Tc of the spinning solution. When the length of the dry space, in other words, the distance between the nozzle tip and the outside coagulating liquid, is less than several centimeters, it is preferable to maintain both the inside and outside coagulating liquids at a temperature of less than Tc, since it is difficult to proceed with the coagulation in the dry space. When the dry space is more than several centimeters, it is relatively easy to proceed with the coagulation in the dry space and, therefore, both temperatures of the inside and outside coagulating liquids may be not less than Tc. In a preferable embodiment, the gas in the dry space is maintained at a temperature of less than Tc. More preferably, all of the inside and outside coagulating liquids and the gas are maintained at a temperature of less than Tc. Also, preferably, the coagulation is substantially completed in the dry space. It is not necessary to use a specific gas as the gas in the dry space, and air is sufficient. Also, it is not particularly required to close the dry space, and the open state is sufficient. In general, an immersion time of several seconds in the outside coagulating liquid is sufficient.

It is preferable that the difference between the transition temperature Tc of the spinning solution and the lowest temperature among the inside and outside coagulating liquids and the gas in the dry space is not less than 10° C., especially not less than 20° C.

When the spinning conditions are adequately set as mentioned above, the spinning solution is suddenly coagulated by the extraction action and the cooling action of the coagulating liquids before the flocculation of polysulfone at the contacting surfaces with the coagulating liquids sufficiently develops. This forms a porous hollow fiber having no skin or dense layer. Also, when the concentration of the spinning solution is from about 10 to about 17% by weight, porous hollow fibers of various grades having pores of about 0.01 to several micrometers in diameter can be easily prepared, merely by changing the temperature of the spinning solution.

The coagulation owing to the coagulating liquids is usually caused by extraction of a solvent with the coagulating liquids from the extruded spinning solution. On the other hand, in the process of the invention, the coagulation of polysulfone is caused by the simultaneous progress of the extraction of a solvent and cooling of the spinning solution to less than the Tc. Therefore, from the viewpoint of the coagulation action owing to the above solvent extraction, both of the liquids having a rapid extraction action and the liquids having a mild extraction action can be employed in the present invention, unlike in a conventional process. In a conventional process, in the case of using a coagulating liquid having the coagulating action owing to rapid solvent extraction, the surface contacting the coagulating liquid becomes a dense layer having pores of less than 0.01 μm. in diameter. Also, a relatively uniform sponge structure is not formed. The section of the hollow fiber has the so-called asymmetric structure in which the pores increasingly become large toward the inside from the surface. In the case of using a coagulating liquid having the coagulating action owing to mild solvent extraction, the conventional process produces a hollow fiber having a dense structure over the entire wall thickness. The water permeability is, therefore, very low. The reason is that in the conventional process the coagulation of the spinning solution is made only by extraction of the solvent.

The hollow fiber immersed and coagulated in the outside coagulating liquid is subsequently immersed in water, etc. to remove the solvent remaining in the fiber, and if necessary, it is then dried. The drying is carried out preferably at a temperature of less than about 150° C. so as not to cause the deformation of the produced hollow fiber.

The hollow fiber filter medium of the present invention is prepared by a simple process, and has pores having a large diameter over the entire wall thickness extending from the inner surface to the outer surface. Thus, it has a high water permeability, and moreover, it is resistant against steam sterilization and is excellent in mechanical strength, chemical resistance and affinity for a living body. Accordingly, it has great practical value as a filter for general use and a filter for medical use.

The present invention is more specifically described and explained by means of the following Examples, in which all % and parts are by weight unless otherwise noted. It is to be understood that the present invention is not limited to the Examples, and various changes and modifications may be made in the invention without departing from the spirit and scope thereof.

EXAMPLES 1 TO 10

In 87 parts of a mixed solvent consisting of 29.5% of propylene glycol and 70.5% of N-methyl-2-pyrrolidone (NMP), 13 parts of a polysulfone (commercially available under the commercial name "Udel Polysuphone P-3500" made by Union Carbide Corp.) was dissolved at 110° C. for 3 hours, with agitation. The resulting solution was defoamed under reduced pressure to give a spinning solution A. The spinning solution A had a transition temperature of 73° C. The spinning was carried out by extruding the spinning solution A from a ring nozzle having an inner diameter of 400 μm. and an outer diameter of 600 μm. at a rate of 3.4 g./minute into an outside coagulating liquid under the conditions shown in Table 1, while extruding an inside coagulating liquid maintained at a prescribed temperature at a rate of 2.5 ml./minute from the inside of the ring nozzle.

The characteristics of the obtained hollow fibers are shown in Table 2, wherein Di(max) shows the largest minor axis (maximum diameter) of the openings present on the inner wall surface of a hollow fiber, Dn(max) shows the largest minor axis of the pores present in the sponge structure in a section of the hollow fiber, and Do(max) shows the largest minor axis of the openigns present on the outer wall surface of the hollow fiber. Observation and measurement was performed using a microscope.

EXAMPLES 11 TO 14

In 87 parts of a mixed solvent consisting of 28.7% of propylene glycol and 71.3% of NMP, 13 parts of the same polysulfone as used in Examples 1 to 10 was dissolved at 110° C. for 3 hours, with agitation. The resulting solution was defoamed under reduced pressure to give a spinning solution B having a transition temperature of 56° C. The spinning was carried out by extruding the spinning solution B from a ring nozzle having an inner diameter of 350 μm. and an outer diameter of 550 μm. at a rate of 3.2 g./minute into an outside coagulating liquid under the conditions shown in Table 1, while extruding an inside coagulating liquid maintained at a prescribed temperature at a rate of 1.8 ml./minute.

The characteristics of the obtained hollow fibers are shown in Table 2.

EXAMPLE 15

A porous hollow fiber having an inner diameter 300 μm., an outer diameter 360 μm., a maximum diameter 0.4 μm. of openings on the inner surface, a maximum diameter 1 μm. of pores in the section and a maximum diameter 1 μm. of openings on the outer surface was prepared in the same manner as in Examples 1 to 10. A bundle of 150 hollow fibers was placed in a polycarbonate pipe having an inner diameter 9 mm., an outer diameter 13 mm. and a length 160 mm., and the both ends of the pipe was treated by potting to give a filter.

The obtained filter was steam-sterilized at 120° C. for 30 minutes, and the bubble point and filtration performance to cow blood of the filter were measured. Also, with respect to the non-steam-sterilized hollow fiber, the bubble point and filtration performance to cow blood were measured in the same manner.

No change between the sterilized filter and the non-sterilized filter was observed, thus it was confirmed that the filter medium of the invention is proof against steam

TABLE 1

| Ex. No. | Spinning solution Kind | Spinning solution Temp. (°C.) | Inside coagulating liquid Kind | Inside coagulating liquid Temp. (°C.) | Dry space Distance (cm) | Dry space Temp. (°C.) | Outside coagulating liquid Kind | Outside coagulating liquid Temp. (°C.) | Spinning rate (m/min.) |
| --- | --- | --- | --- | --- | --- | --- | --- | --- | --- |
| 1 | A | 85 | water | 20 | 15 | 25 | water | 25 | 20 |
| 2 | A | 85 | 70% aqueous soln. of NMP | 10 | 15 | 25 | " | 25 | 30 |
| 3 | A | 85 | 70% aqueous soln. of NMP | 20 | 15 | 25 | " | 25 | 30 |
| 4 | A | 85 | 70% aqueous soln. of NMP | 30 | 15 | 25 | " | 25 | 30 |
| 5 | A | 85 | 70% aqueous soln. of NMP | 40 | 15 | 25 | " | 25 | 30 |
| 6 | A | 85 | 70% aqueous soln. of NMP | 40 | 15 | 25 | " | 25 | 35 |
| 7 | A | 85 | 70% aqueous soln. of NMP | 40 | 15 | 25 | " | 25 | 45 |
| 8 | A | 80 | 70% aqueous soln. of NMP | 20 | 15 | 25 | " | 25 | 30 |
| 9 | A | 85 | 70% aqueous soln. of NMP | 40 | 15 | 25 | 70% aqueous soln. of NMP | 25 | 30 |
| 10 | A | 85 | 70% aqueous soln. of NMP | 40 | 15 | 25 | methanol/ acetone = 1/1 by wt. | 25 | 30 |
| 11 | B | 60 | water | 10 | 15 | 25 | water | 25 | 30 |
| 12 | B | 60 | 50% aqueous soln. of NMP | 10 | 15 | 25 | " | 25 | 30 |
| 13 | B | 60 | methanol | 10 | 15 | 25 | " | 25 | 30 |
| 14 | B | 60 | methanol/ acetone = 1/1 by wt. | 10 | 15 | 25 | " | 25 | 30 |

TABLE 2

| | Characteristics of hollow fiber | | | | | |
| --- | --- | --- | --- | --- | --- | --- |
| Ex. No. | Inner diameter (μm) | Outer diameter (μm) | Di(max) (μm) | Dn(max) (μm) | Do(max) (μm) | Water permeability (g/cm$^2$ · mm Hg · min.) |
| 1 | 360 | 460 | 0.15 | 1.5 | 1.5 | $7.5 \times 10^{-3}$ |
| 2 | 320 | 440 | 0.30 | 1.5 | 1.0 | $12 \times 10^{-3}$ |
| 3 | 320 | 440 | 0.35 | 1.5 | 1.0 | $13 \times 10^{-3}$ |
| 4 | 320 | 440 | 0.4 | 1.5 | 1.0 | $16 \times 10^{-3}$ |
| 5 | 320 | 440 | 0.7 | 1.5 | 1.0 | $17 \times 10^{-3}$ |
| 6 | 290 | 400 | 1.0 | 1.5 | 1.0 | $20 \times 10^{-3}$ |
| 7 | 260 | 340 | 1.0 | 1.5 | 1.0 | $25 \times 10^{-3}$ |
| 8 | 320 | 440 | 0.2 | 1.5 | 1.0 | $8.6 \times 10^{-3}$ |
| 9 | 320 | 440 | 0.7 | 1.5 | 1.0 | $17 \times 10^{-3}$ |
| 10 | 320 | 440 | 0.7 | 1.5 | 1.0 | $17 \times 10^{-3}$ |
| 11 | 300 | 480 | 0.01 | 1.0 | 0.5 | $2.0 \times 10^{-3}$ |
| 12 | 300 | 480 | 0.1 | 1.0 | 0.5 | $5.3 \times 10^{-3}$ |
| 13 | 300 | 480 | 0.01 | 1.0 | 0.5 | $3.6 \times 10^{-3}$ |
| 14 | 300 | 480 | 0.01 | 1.0 | 0.5 | $3.5 \times 10^{-3}$ | sterilization at high temperatures. Also, the appearance of the filter was not changed by steam sterilization.

What is claimed is:

1. A filter medium in the form of a hollow fiber made of a polysulfone having a network structure over the entire thickness from the inner surface to the outer surface, and therefore, having no skin layer, the pores having a maximum diameter as determined by measuring the largest minor axis of a pore opening observed by microscopic inspection of a portion of the filter medium, of 0.1 to 5 μm., the openings of the pores formed in the inner surface having a maximum diameter of 0.01 to 10 μm. and the openings of the pores formed in the outer surface having a maximum diameter of 0.01 to 5 μm.

2. In a process for preparing a hollow fiber filter medium by extruding a solution of a polysulfone in a solvent from a ring nozzle together with an inside coagulating liquid extruded from the inside of the ring nozzle, and immediately or after passing through a dry space of not more than 50 cm., bringing the extrudate into contact with an outside coagulating liquid, the improvement which comprises extruding the solution having a transition temperature at which the viscosity rise changes to the viscosity drop when the temperature of the solution is dropped, said transition temperature within the range of 30° to 150° C. and being maintained at a temperature of not less than said transition temperature, while maintaining at least one of the inside coagulating liquid, the dry space and the outside coagulating liquid at a temperature of at least 10° C. less than said transition temperature.

3. The process of claim 2, wherein said transition temperature is from 50° to 150° C.

4. The process of claim 2, wherein the difference between the transition temperature of the polysulfone solution and the lowest temperature among those of the inside coagulating liquid, the dry space and the outside coagulating liquid is at least 20° C.

5. The filter medium of claim 1, wherein the water permeability of the hollow fibers is at least $2.0 \times 10^{-3}$ g/cm.$^2$mmHg.min.

* * * * *